United States Patent
Mathal et al.

(10) Patent No.: US 8,391,656 B2
(45) Date of Patent: Mar. 5, 2013

(54) GRATING COUPLED CONVERTER

(75) Inventors: Sagi V. Mathal, Palo Alto, CA (US); David A. Fattal, Mountain View, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 236 days.

(21) Appl. No.: 12/846,740

(22) Filed: Jul. 29, 2010

(65) Prior Publication Data

US 2012/0027347 A1 Feb. 2, 2012

(51) Int. Cl.
*G02B 6/34* (2006.01)
*G02B 6/12* (2006.01)

(52) U.S. Cl. ............................. 385/37; 385/14
(58) Field of Classification Search ............ 385/37
See application file for complete search history.

(56) References Cited

U.S. PATENT DOCUMENTS

| | | | | |
|---|---|---|---|---|
| 5,061,027 A * | 10/1991 | Richard | ........................... | 385/14 |
| 5,299,057 A | 3/1994 | Rideout et al. | | |
| 5,568,574 A * | 10/1996 | Tanguay et al. | ................... | 385/14 |
| 5,790,728 A * | 8/1998 | Wentworth | ........................ | 385/39 |
| 5,832,147 A * | 11/1998 | Yeh et al. | ........................... | 385/14 |
| 6,453,105 B1 | 9/2002 | Johnson et al. | | |
| 6,597,825 B1 | 7/2003 | Yuan et al. | | |
| 6,661,940 B2 * | 12/2003 | Kim | ............................... | 385/15 |
| 6,718,093 B2 * | 4/2004 | Zhou | ............................... | 385/37 |
| 7,259,031 B1 * | 8/2007 | Dickinson et al. | ............... | 438/23 |
| 7,283,695 B2 * | 10/2007 | Gaylord et al. | ................... | 385/14 |
| 7,333,692 B1 * | 2/2008 | Mossberg et al. | ............... | 385/37 |
| 7,480,429 B1 * | 1/2009 | Chiniwalla et al. | .............. | 385/37 |
| 7,574,084 B2 | 8/2009 | Yan et al. | | |
| 8,267,583 B2 * | 9/2012 | Yao et al. | ........................ | 384/31 |
| 2003/0086649 A1 * | 5/2003 | Zhou | ............................... | 385/37 |
| 2006/0013527 A1 * | 1/2006 | Morel et al. | ...................... | 385/24 |
| 2008/0310852 A1 * | 12/2008 | Tan et al. | ......................... | 398/136 |
| 2009/0194891 A1 * | 8/2009 | Jin et al. | ......................... | 264/1.27 |
| 2009/0196547 A1 | 8/2009 | Mekis | | |
| 2009/0244716 A1 | 10/2009 | Mathai et al. | | |
| 2010/0028018 A1 * | 2/2010 | Tan et al. | ......................... | 398/141 |
| 2010/0329603 A1 * | 12/2010 | Kopp | ............................... | 385/14 |
| 2011/0129231 A1 * | 6/2011 | Fiorentino et al. | ............ | 398/141 |
| 2012/0027347 A1 * | 2/2012 | Mathal et al. | ................... | 385/37 |
| 2012/0039562 A1 * | 2/2012 | Tan et al. | ......................... | 385/14 |

FOREIGN PATENT DOCUMENTS

WO WO2009096981 A1 8/2009

OTHER PUBLICATIONS

Yeo, J.S. et al., "Compensation of beam walk-off in hollow metal waveguides" Applied Physics A (2009) 95: 1073-1077.
Uemukai, Masahiro et al., "Monolithically Integrated Master Oscillator Power Amplifier With Grating Coupler for Collimated Output Beam" Jpn. J. Appl. Phys. 39 (2000) pp. 1503-1507.

* cited by examiner

*Primary Examiner* — Rhonda Peace

(57) ABSTRACT

A chip includes a grating coupler and an optoelectronic converter. The grating coupler is patterned to extract a first fraction of incident light and to transmit a second fraction of the incident light as an output optical signal from the chip. The optoelectronic converter receives the first fraction of the incident light from the grating coupler and produces an electrical signal from light received.

24 Claims, 2 Drawing Sheets

GRATING COUPLED CONVERTER

BACKGROUND

Servers, computers, and other systems that require high data rate communication channels have employed optical signals for communication among subsystems and circuit boards. Optical signals have the advantage of avoiding the signal loss resulting from the impedance inherent when transmitting high frequency electrical signals on conductive lines. In particular, with data rates on the order of one Gbit/second or more, transmission of electrical signals on conductive lines more than a few centimeters in length can result in significant signal loss and noise.

Many systems and devices for transmission and conversion of optical signals on or between printed circuit boards have been developed. One solution for optical signaling employs hollow core waveguides. Hollow core waveguides, which are sometimes referred to as hollow metal waveguides or light pipes, have walls lined with a reflective coating such as one or more layers of metal, dielectrics, or other materials that make the walls suitably reflective. The reflective walls surround a hollow core or air channel in which a light beam can propagate. Hollow core waveguides can provide advantages in many systems. For example, a light beam transmitted through a hollow core waveguide can often be guided around sharper bends than are possible with some other waveguides or optical fibers that rely on total internal reflection. Also, the cross-section of a hollow core waveguide can also be large relative to the wavelength of the light guided, so that a hollow core waveguide can guide light beams with relatively large beam widths. Hollow core waveguides further allow transition between guided and free space propagation of light without an air-solid interface at which optical power can be lost. For data transmissions at higher data rates, new systems and methods for transmission and conversion of optical signals will be needed, and systems and methods that work with hollow core waveguides may be desired.

BRIEF DESCRIPTION OF THE DRAWINGS

Use of the same reference symbols in different figures indicates similar or identical items.

DETAILED DESCRIPTION

In accordance with an aspect of the invention, a monolithic integrated structure or chip can include a converter and a grating coupler. The grating coupler couples a fraction of the light from an input optical signal into the converter and transmits the remainder of the optical signal for continued propagation to other devices. The converter converts the extracted portion of the optical signal into an electrical signal for use in external circuits or circuitry that may be integrated in the same monolithic structure as the converter and the grating coupler. The integrated structure can be mounted with the grating coupler in a path of an optical signal, e.g., in a gap between waveguides, and operate as a tap to produce an electrical signal representing information for local use while the optical signal conveys the information over greater distances to other locations where the information may be processed. The grating coupler may also be adapted to selectively extract all or a portion of a specific frequency component in a wavelength division multiplexed (WDM) optical signal. Integrating the grating coupler into the same structure as a converter allows tapping from an optical signal without the need for separate optical elements such as beam splitters and without the need for additional mounting for the separate optical elements.

Figure 1:
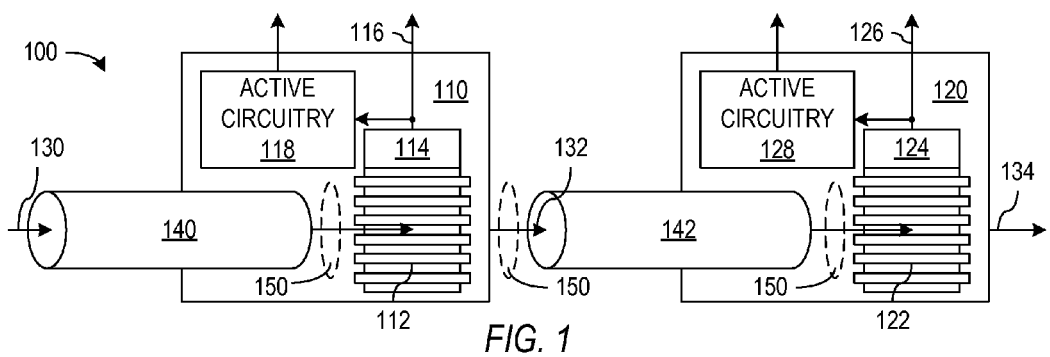
FIG. 1 shows an embodiment of the invention in which multiple taps, each integrating an optoelectronic converter and a grating coupler on a chip, convert portions of an optical signal into respective electrical signals.

FIG. 1 illustrates a system 100 in accordance with an embodiment of the invention employing multiple tap chips 110 and 120 that extract and convert energy or information from optical signals. FIG. 1 shows only two tap chips 110 and 120 but more generally N tap chips could be arranged in series to extract and convert optical energy. Each tap chip 110 or 120 has an integrated monolithic structure containing a grating coupler 112 or 122 and an optoelectronic converter 114 or 124. The grating coupler 112 or 122 extracts a fraction of the power in the incident optical signal. Grating couplers 112 and 122 can be substantially identical to extract the same fraction of the received optical energy. However, extracting the same fraction of the received optical energy will result in the downstream tap chip 120 extracting and converting less optical energy than tap chip 110. Accordingly, in some embodiments, it may be desirable that tap chips 110 and 120 differ to extract different fractions of the optical energy. For example, for equal optical power extraction and conversion at each of N tap chips located in series along a waveguide with zero propagation loss, the tap ratio or fractions of optical energy extracted by the ith tap chip can be $f_i=1/(N-i)$ for an index i running from 0 to N−1.

Figure 2:
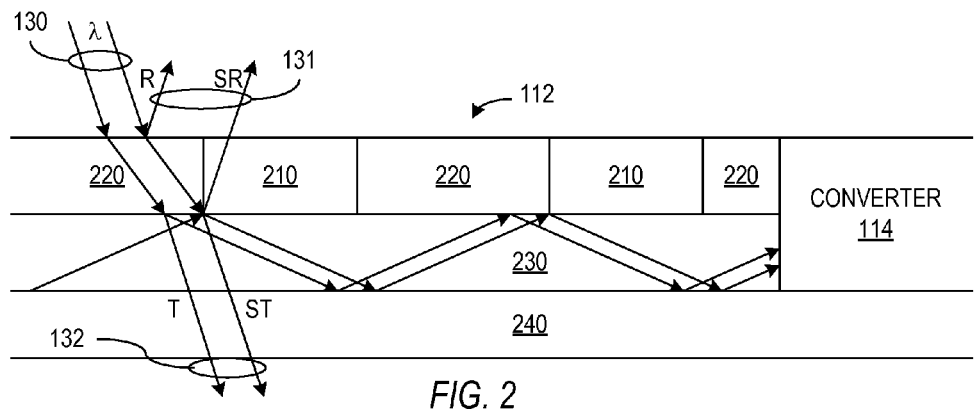
FIG. 2 shows an embodiment of the invention in which a sub-wavelength grating couples a first portion of an input optical signal into an optoelectronic converter and transmits a second portion as an output optical signal.

In one embodiment, each grating coupler 112 or 122 is a sub-wavelength grating using regions of different refractive indices to produce scattering and interference that direct a portion of the incident light to the associated optoelectronic converter 114 or 124. FIG. 2 shows a cross-sectional view of an exemplary embodiment in which grating coupler 122 includes regions 210 and 220 that differ in refractive index. Each region 210 and 220 may have dimensions smaller than the wavelength of the optical signal handled. For example, for visible light with wavelengths between about 390 nm and 750 nm, regions 210 may have a minimum width on the order of tens of nanometers. Regions 210 and 220 can also have different shapes and patterns depending on the specific function of grating coupler 112. For example, regions 210 and 220 can be stripes as shown in FIG. 1, but with striped-shaped regions 210 and 220, the behavior of grating coupler 120 can differ when light in optical signal 130 has a linear polarization along the direction of the stripes or perpendicular to the stripes. A two-dimensional pattern of regions 210 or 220 having circular, rectangular, or other shapes could be used to avoid or reduce polarization dependent effects.

Regions 220 can be made of a different material from regions 210 or treated to provide a different refractive index to the incident light manipulated. Alternatively, regions 220 may be holes or cavities that are similar in size to regions 210 and are formed using semiconductor device fabrication techniques, e.g., photolithography or imprint lithography and etching or deposition and liftoff that form a patterned layer of material including regions 210. Conventional semiconductor device fabrication techniques can also be employed to fabricate an optoelectronic converter 114, e.g., a silicon-germanium photodiode or PIN diode with or without associated signal conditioning circuits such as amplifiers, automatic gain control circuits, buffers, and filters. Additional active circuitry (e.g., active circuitry 118 of FIG. 1) can be formed in and on the same substrate 240.

Regions 210 and 220 are on a waveguide layer 230, which may contain a material having a refractive index that is higher than the refractive indices of regions 210 and 220. For example, when optical signal contains visible light, regions 210 and 220 can respectively be silicon dioxide and air gaps, and waveguide layer 230 can be silicon nitride or silicon oxynitride. Underlying substrate 240 may be made of or contain a layer of material having a refractive index that is lower than the refractive index of waveguide layer 230. For example for optical signals using visible light, waveguide layer 230 can be silicon nitride or silicon oxynitride and substrate 240 may be quartz or glass. Some other suitable materials for waveguide layer 230 for light in the visible range include titanium oxide and some III-V semiconductor materials such as InP, GaAs for red light, and GaP for light in a range of frequencies up to blue. For telecom wavelengths (i.e., about 1550 nm), substrate 240 can be part of a silicon-on-insulator (SOI) substrate with the silicon device layer corresponding to waveguide layer 230 and the patterned grating regions 210 and 220. Different compositions and dimensions of regions 210 and 220 and waveguide layer 230 can be selected for tapping optical signals containing light of other wavelengths. In some embodiments, substrate 240 may be partially removed or completely removed from the grating regions.

The optical characteristics of grating coupler 112 for a target frequency of light incident at a target incidence angle can be controlled through selection of the size, spacing, and pattern of regions 210 and 220. FIG. 2 shows an incident optical signal beam 130 that interacts with regions 210 and 220. In general, the direct interaction of incident light beam 130 with regions 210 and 220 produces reflected light R, transmitted light T, and scattered light. The scattered light that is coupled into waveguide layer 230 also interacts with regions 210 and 220 so that a portion for light initially coupled into waveguide layer 230 is scattered out as a secondary reflected beam SR and a secondary transmitted beam ST, which may interfere with reflected beam R and transmitted beam T. Suitable selection of the refractive index, size and spacing of regions 210 and 220, the thickness of waveguide layer 230, and the angle of incidence can cause total destructive interference of reflected beams R and SR when optical signal 130 has a target frequency. Further, the geometry of regions 210 and 220 and waveguide layer 230 can control the percentage of power transmitted in beams T and ST and the percentage of optical power directed to converter 114 through waveguide layer 230. Techniques for designing gratings to achieve specific optical characteristics are known in the art. In particular, the light-matter interactions are well understood, and computer simulations, e.g. with a Finite Difference Time Domain (FDTD) software, can find a grating pattern that achieves desired coupling or transmission fractions using the refractive index variations associated with the materials available for use in the grating coupler.

Returning to FIG. 1, system 100 operates on an input optical signal 130, which may propagate through a waveguide 140 or other optical system to grating coupler 112 of the first tap chip 110. In one embodiment, waveguide 140 is a hollow core waveguide, which can be formed in or on a circuit board. Hollow core waveguides can have core cross-sections of any desired shape including square or rectangular cross-sections instead of the circular cross section illustrated in FIG. 1. In another embodiment, waveguide 140 could be an optical fiber or a solid core waveguide. However, a hollow core waveguide may have an advantage for some applications in that the optical signal 130 does not traverse an interface between a solid and air when exiting a hollow core waveguide or when reentering a hollow core waveguide after passing through tap chip 110.

FIG. 1 illustrates an embodiment in which grating couplers 112 and 122 receive optical signals 130 and 132 that are incident perpendicular to a major surface of tap chip 110 or 120, but in other embodiments, grating coupler 112 or 122 may be designed to receive optical signals at a non-normal incidence. Grating coupler 112 in tap chip 110 extracts a portion of the light from optical signal 130 and directs the extracted light to optoelectronic converter 114, which converts that light into an electrical signal 116. Electrical signal 116 can then be used by on-chip active circuitry 118 or output from tap chip 110 for use in other devices (not shown). On-chip active circuitry 118 in general is not limited to performing signal conditioning functions but can perform other useful functions such as logic or memory operations.

An output optical signal 132 transmitted through grating coupler 112 exits through a back surface of tap chip 110 and propagates to tap chip 120. A waveguide 142 or other optical system can be used as shown in FIG. 1 to direct optical signal 132 to chip 120. Grating coupler 122 in tap chip 120 extracts a portion of optical signal 132, and optoelectronic converter 124 converts the extracted light to an electrical signal 126, which may be used in on-chip active circuitry 128 or output for external use. Tap chip 120 also transmits a portion of optical signal 132 as an output optical signal 134 for possible use elsewhere, for example, by one or more other tap chips (not shown).

Between waveguides 140 and 142, a portion of the optical signal may be lost due to diffraction. In some embodiments, the diffraction loss is not acceptable. In these systems, microlenses 150 or other optical elements at the exit of waveguide 140 and the entrance to waveguide 142 may be employed to reduce or eliminate the diffraction loss. In other embodiments, microlenses 150 are not required and may be eliminated to reduce part count, simplify assembly, or reduce costs.

System 100 can be employed for high data rate optical signaling among devices. For example, in one embodiment, waveguides 140 and 142 can be hollow core waveguides built on or into a circuit board to guide optical signals modulated for information transmission at rates on the order of 1 Gbit/sec or more. Gaps between the ends of separate sections of waveguide can then be provided in the waveguide at locations where the information from the optical signals is used or processed on the circuit board, and tap chips such as tap chips 110 and 120 can be mounted on the circuit board so that their grating couplers are in the respective gaps. An optical signal propagating through the hollow core waveguide and reaching a gap will be partly absorbed and converted by the tap chip in the gap and partly transmitted through the tap chip and back into the waveguide. Additional optical elements such as lens, beam splitters, and mirrors may not be required. Accordingly, high data rate signals can be transmitted over significant distances, e.g., tens or hundreds of cm, using optical signals, while taps for conversion to electrical signals can be provided with a minimum of optical overhead.

In general, optical signal 130 may be any type of optical signal. For example, in one specific embodiment, optical signal 130 is a monochromatic signal having an amplitude that is modulated to represent an information stream, and each grating coupler 112 or 122 is designed to extract a fraction of the energy of the input optical signal and transmit the remainder of the optical energy as an output optical signal. In another embodiment, the optical signal is a wavelength division multiplexed (WDM) signal containing multiple frequency components or a polarization multiplexed signal containing components with orthogonal polarizations, and each frequency or polarization component of optical signal 110 can be separately modulated to represent a different information stream. When optical signal 130 is a multiplexed optical signal, grating coupler 112 or 122 can be designed to extract a portion of just one of the frequency or polarization components, so that optoelectronic converters 114 and 124 produce respective electrical signals representing the same information stream. Alternatively, grating coupler 112 may extract all or a fraction of one frequency or polarization component, while grating coupler 122 extracts all or a fraction of a different frequency or polarization component. In which case, converters 114 and 124 produce respective electrical signals representing different information streams. More generally, at each tap, each frequency or polarization component can be either tapped (i.e., fully or partially absorbed) or transmitted without being tapped depending on whether the information encoded in the frequency or polarization component is required or not at the location of the tap.

Figure 3:
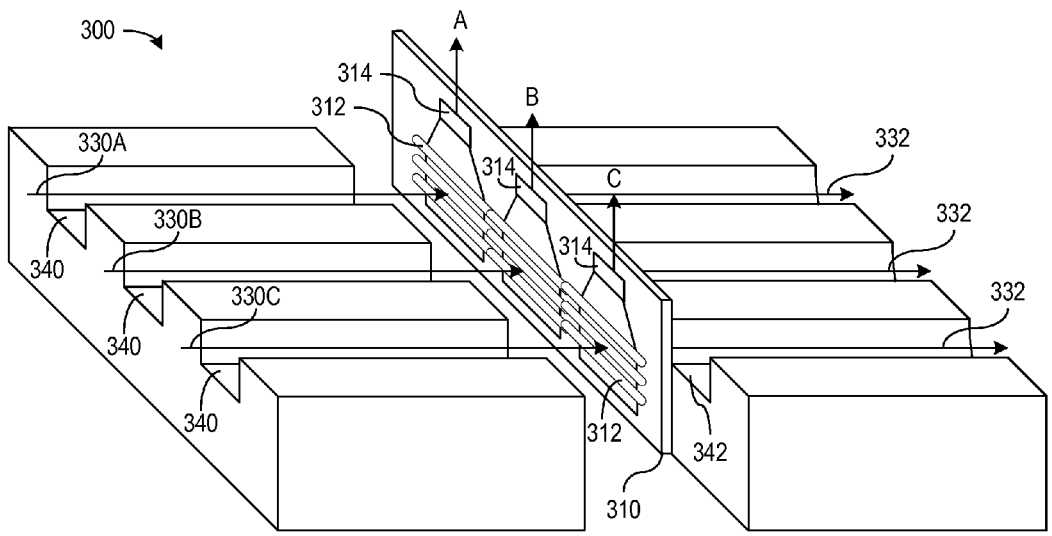
FIG. 3 shows a partial cutaway view of an embodiment of the invention in which a monolithic integrated structure or chip includes multiple taps for parallel optical signals.

FIG. 3 shows a partial cutaway view of a system 300 in accordance with an embodiment of the invention employing a tap chip 310 containing multiple grating couplers 312 with associated optoelectronic converters 314. Each grating coupler 312 and optoelectronic converter 314 can have the same structure as grating coupler 112 and optoelectronic converter 114 as described above with reference to FIGS. 1 and 2. Tap chip 310 however simultaneously taps parallel optical signals 330A, 330B, and 330C, which are generically referred to herein as optical signals 330. As shown, optical signals 330 are spatially separated and may be guided to tap chip 310 by separate waveguides 340. (The top halves of waveguides 340 and 342 are cut away in FIG. 3 to better illustrate the path of optical signals 330 and 332.) With the spatial separation of signals 330, signals 330 can use beams of light having the same carrier frequency because grating couplers 312 in tap chip 310 have a matching spacing, and different optoelectronic converters 314 can output different electrical signals A, B, and C corresponding to the modulation of respective optical signals 330A, 330B, and 330C. Each grating coupler 312 may extract only a fraction of the energy of the incident optical beam 330A, 330B, or 330C, so that the remainder of the optical energy passes through tap chip 310 and may be guided by waveguides 342 or other optical systems to another tap chip (not shown) that produces electrical signals for local use at another location.

Figure 4:
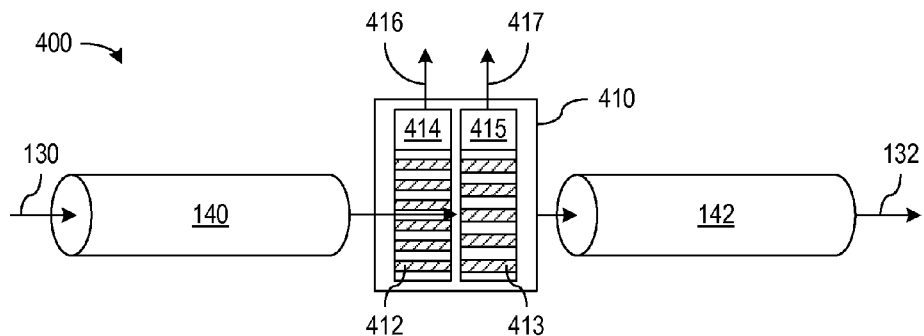
FIG. 4 shows an embodiment of the invention in which a monolithic integrated structure or chip includes multiple taps for different frequency components of a wavelength division multiplexed optical signal.

FIG. 4 illustrates a system 400 in accordance with an embodiment of the invention in which a tap chip 410 includes multiple grating couplers 412 and 413 that operate to extract different frequencies of light from an optical signal 130. For example, if optical signal 130 is a multiplexed optical signal containing multiple frequency or polarization components with each component separately modulated to represent a different information stream, grating coupler 412 can be designed to extract a fraction of the energy in a first component of optical signal 130 and transmit nearly 100% of the light corresponding to a second (and any other) component of optical signal 130. In contrast, grating coupler 413 can be designed to extract a fraction of the energy in the second component and transmit nearly 100% of the light corresponding to the first (and any other) component of optical signal 130. Optoelectronic converters 414 and 415 are respectively coupled to grating couplers 412 and 413 and convert the light extracted from the two different components of the multiplexed optical signal 130 into parallel electrical signals 416 and 417. The remaining energy of signal 130 is transmitted through tap chip 410 and a waveguide 142 for possible conversion by other tap chips (not shown) that may be downstream of tap chip 410.

For ease of illustration, FIG. 4 shows a configuration in which grating couplers 412 and 413 are laterally spaced from each other on tap chip 410, but other configurations could be used. For example, grating coupler 412 could be integrated in layers of tap chip 410 that overlie (or underlie) the layers in which grating coupler 413 is formed, so that the entire area of signal 130 is incident on both grating couplers 412 and 413. Alternatively, the grating couplers may be on separate chips and stacked or arranged in series.

Figure 5:
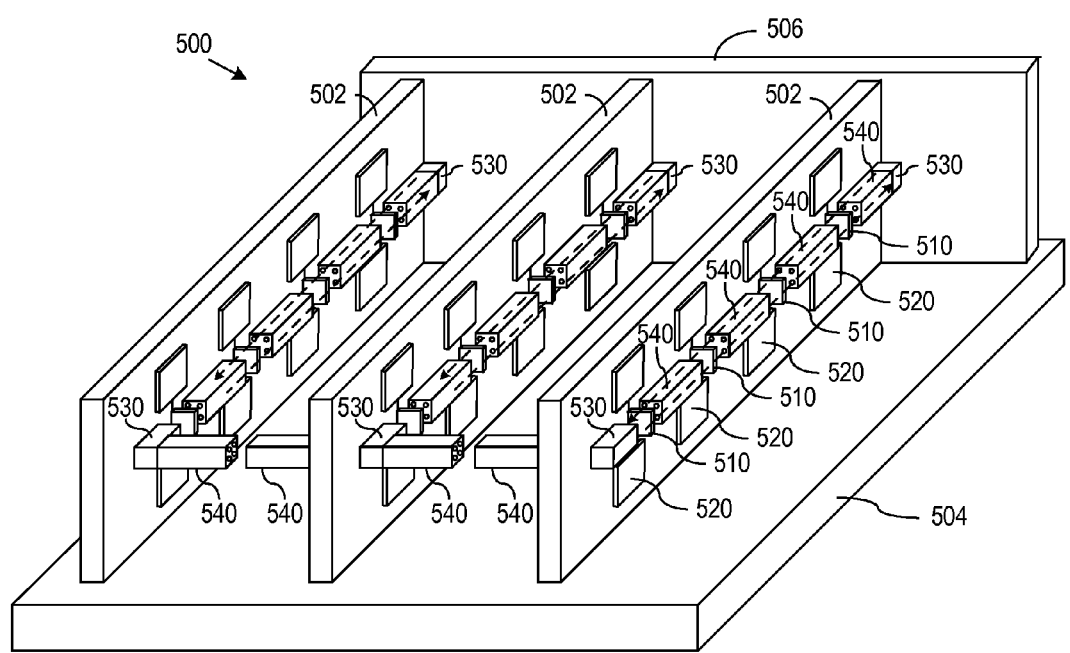
FIG. 5 is a perspective view of an embodiment of the invention in which tap chips having integrated grating couplers and photodiodes convert portions of optical signals into electrical signals that are used locally in devices on circuit boards or blades of a server.

The tap chips described above can be employed in a system using optical signaling to distribute information. FIG. 5 illustrates an exemplary embodiment of the invention using tap chips 510 to produce electrical signals for local use within a server system 500. Server system 500 includes a set of blades 502 that are mounted on a chassis 504 and connected to a shared backplane 506. Some or all of blades 502 in system 500 may be substantially identical or of differing designs to perform different functions. For example, some blades 502 may be server blades or storage blades. Additional components such as power supply transformers and cooling fans (not shown) can also be connected to chassis 504 or backplane 506, and the entire assembly would typically be contained in a shared enclosure (not shown). A user interface and sockets for external connections to server system 500 may be provided through the shared enclosure.

Each blade 502 includes one or more subsystems 520 that implement the particular functions of the blade 502. Subsystems 520 may be mounted on either one or both sides of each blade 502 in the manner of components on a printed circuit board, or blades 502 may include enclosures with subsystems 520 in the interior of the blade 502. Typical examples of such subsystems 520 include integrated circuit chips, hard drives or other data storage, and processor subsystems containing conventional computer components such as microprocessors, memory sockets, and integrated circuit memory. Subsystems 520 and the general features of blades 502 may be of conventional types known for server systems using blade architectures, such as the c-class architecture of server systems commercially available from Hewlett-Packard Company.

Each blade 502 in system 500 employs optical signals for communication among subsystems 520 on that blade 502, other blades 502, or backplane 506. For direct optical communication, some of blades 502, backplane 506, or subsystems 520 have associated optical transmitters 530. Each transmitter 530 is aligned to transmit an optical signal into a corresponding hollow core waveguide 540 that may guide optical signals along a blade 502 or be aligned with hollow core waveguides 540 on an adjacent blade 502 for free space transmission of optical signals between blades. U.S. Pat. App. Pub. No. 20100028018, entitled "Free-Space Optical Interconnect with Asymmetric Light Pipes," further describes systems for optical communications within a server and is hereby incorporated by reference in its entirety. Each transmitter 530 may include an array of light sources or emitters such as vertical cavity surface emitting lasers (VCSELs) or light emitting diodes (LEDs) that can be integrated into or on an integrated circuit die. Each light source in transmitter 530 emits a beam that may be modulated to encode information for transmission at a high data rate, e.g., about 10 Gbit/s.

Tap chips 510 are positioned at locations where electrical signals representing information in the optical signals are needed. In particular, each subsystem 520 can be electrically connected to a corresponding tap chip 510 that is physically close to the subsystem 520 using the extracted information. Tap chips 510 are mounted in gaps between sections of waveguides 540 and have respective grating couplers positioned to tap a portion of the optical signals propagating through free space between waveguide sections 540. In one embodiment, the gaps between waveguide sections 540 are about 0.5 to 2 cm, and waveguide sections 540 include light pipes or hollow core waveguides that have a core width of about 150 microns. As illustrated, tap chips 510 can be placed in gaps between sections of hollow core waveguides without additional optical components such as beam splitters or lenses. For the orientations of tap chips 510 shown in FIG. 5, each tap chip 510 can be mounted perpendicular to and directly on a blade 502 or a circuit board that is part of blade 502, or tap chips 510 can be mounted in the plane of a flex circuit (not shown) that is bent for insertion of the tap chips 510 into the optical signal path between waveguide sections 540. Alternatively, tap chips 510 could be mounted in the plane and on the edge of a circuit board that may be part of a blade 502, or a tap chip 510 could be mounted in the plane of a circuit board that has a window through which an optical signal passes. Other methods for mounting tap chips 510 between waveguide sections 540 can be employed in other embodiments of the invention.

Backplane 506 and chassis 504 may similarly contain subsystems (not shown) that communicate with each other or with subsystems 520 on blades 502 using optical signals. Tap chips and waveguides may be employed in backplane 506 and chassis 504 in the same or similar manner as described and illustrated for blades 502.

Although the invention has been described with reference to particular embodiments, the description is only an example of the invention's application and should not be taken as a limitation. For example, although exemplary embodiment of the invention are described as using optical signals or light, those terms are used in the general sense and particularly are not limited to visible light. Embodiments of the invention can employ electromagnetic radiation of other frequencies including but not limited to infrared, visible, and ultraviolet light. Various other adaptations and combinations of features of the embodiments disclosed are within the scope of the invention as defined by the following claims.

What is claimed is:

1. A system comprising a first chip having integrally formed therein:
   a first grating coupler including a sub-wavelength grating patterned to extract a first fraction of incident light having a first frequency and to transmit a second fraction of the incident light as an output optical signal from the first chip; and
   a first optoelectronic converter coupled to receive the first fraction of the incident light from the first grating coupler, wherein the first optoelectronic converter produces a first electrical signal from the first fraction of the incident light.

2. The system of claim 1, further comprising active circuitry integrated in the first chip, wherein the active circuitry processes the first electrical signal.

3. The system of claim 1, further comprising a second chip positioned to receive the output optical signal from the first chip, the second chip having integrally formed therein:
   a second grating coupler; and
   a second optoelectronic converter coupled to receive light from the second grating coupler, wherein the second optoelectronic converter produces a second electrical signal from light received from the second grating coupler.

4. The system of claim 3, wherein the second grating coupler that is patterned to extract a third fraction of incident light having the first frequency and to transmit a fourth fraction of the incident optical energy as an output optical signal from the second chip.

5. The system of claim 4, wherein the first and third fractions are such that optical power converted by the first optoelectronic converter is equal to optical power converted by the second optoelectronic converter.

6. The system of claim 4, wherein the first grating coupler directs light having the first frequency and a first polarization to the first optoelectronic converter and the second grating coupler directs light having the first frequency and a second polarization to the second optoelectronic converter.

7. The system of claim 3, further comprising a waveguide that guides the output signal from the first chip to the second chip.

8. The system of claim 7, wherein the waveguide comprises a hollow core waveguide.

9. The system of claim 7, wherein no optical elements are between the first chip and the waveguide or between the waveguide and the second chip.

10. The system of claim 7, further comprising a lens between the first chip and the waveguide or between the waveguide and the second chip.

11. The system of claim 7, wherein the waveguide guides the output signal from a back surface of the first chip to a front surface of the second chip.

12. The system of claim 3, further comprising:
   a circuit board on which the first and the second chip are mounted;
   a first electrical circuit coupled to receive the first electrical signal;
   a second electrical circuit coupled to receive the second electrical signal; and
   a waveguide that guides the output signal from the first chip to the second chip.

13. The system of claim 3, further comprising a server in which the first and the second chips are mounted, wherein the server further comprises:
   a first subsystem coupled to receive the first electrical signal;
   a second subsystem coupled to receive the second electrical signal; and
   a waveguide that guides the output signal from the first chip to the second chip.

14. The system of claim 1, wherein the first chip further includes:
   a second grating coupler; and
   a second optoelectronic converter coupled to receive light from the second grating coupler, wherein the second optoelectronic converter produces a second electrical signal from light received from the second grating coupler.

15. The system of claim 14, wherein the second grating coupler is patterned to extract some incident light having the first frequency and to transmit remaining incident light from the first chip.

16. The system of claim 14, wherein the second grating coupler is patterned to extract some incident light having a second frequency and to transmit remaining incident light from the first chip.

17. The system of claim 1, wherein the incident light on the first grating coupler is incident on a front surface of the first chip, and the first grating coupler is to transmit the second fraction of the incident light as an output optical signal from a back surface of the first chip.

18. A system comprising:
   a plurality of tap chips, each tap chip having integrally formed therein a grating coupler and an optoelectronic converter, wherein the grating coupler includes a sub-wavelength grating and directs some incident light to the optoelectronic coupler and outputs some of the incident light from the tap chip; and
   a plurality of waveguide sections, each of the waveguide sections being positioned between a corresponding pair of the tap chips so as to direct light output from one of the tap chips to another of the tap chips.

19. The system of claim 18, further comprising a circuit board on which the tap chips are mounted.

20. The system of claim 18, further comprising a plurality of electronic subsystems mounted on the circuit board, the electronic subsystems being respectively connected to receive electrical signals from the optoelectronic converters.

21. The system of claim 18, further comprising:
   a first circuit board on which one or more of the tap chips are mounted; and
   a second circuit board on which one or more of the tap chips are mounted, wherein
   at least one of the waveguide sections directs light between the first circuit board and the second circuit board.

22. The system of claim 18, wherein each of the tap chips receives the incident light at a front surface of the tap chip, and transmits output light from a back surface of the tap chip.

23. The system of claim 18, wherein each of the waveguide sections receives light transmitted from a back surface of one of the tap chips and directs the light to a front surface of another of the tap chips.

24. The system of claim 18, wherein:
   the tap chips are arranged in series along a light path of an optical signal passing through the waveguides; and
   each of the tap chips extracts from the optical signal a different fraction of optical power incident on the tap chip.

* * * * *

UNITED STATES PATENT AND TRADEMARK OFFICE
CERTIFICATE OF CORRECTION

| | | |
|---|---|---|
| PATENT NO. | : 8,391,656 B2 | Page 1 of 1 |
| APPLICATION NO. | : 12/846740 | |
| DATED | : March 5, 2013 | |
| INVENTOR(S) | : Mathai et al. | |

It is certified that error appears in the above-identified patent and that said Letters Patent is hereby corrected as shown below:

On the Title page, in Item [75], delete "Mathal," and insert -- Mathai, --, therefor.

Signed and Sealed this
Twelfth Day of November, 2013

Teresa Stanek Rea
*Deputy Director of the United States Patent and Trademark Office*